March 10, 1953  F. H. MUELLER  2,631,002
ANGLE VALVE WITH DIAGONAL O RING SEAL
Filed Jan. 27, 1949

Inventor:
Frank H. Mueller,
By Cushman, Darby & Cushman
ATTORNEYS.

Patented Mar. 10, 1953

2,631,002

UNITED STATES PATENT OFFICE 2,631,002

ANGLE VALVE WITH DIAGONAL O-RING SEAL

Frank H. Mueller, Decatur, Ill., assignor to Mueller Co., Decatur, Ill., a corporation of Illinois Application January 27, 1949, Serial No. 73,027

5 Claims. (Cl. 251—103)

This invention relates to rotary plug valves, particularly to rotary plug angle valves, and has for an object the provision of a valve employing a diagonally disposed sealing ring recessed into the plug thereof.

A further object of this invention is to provide a rotary plug angle valve of simplified construction, adapted for use in a high pressure fluid line.

A further object is the provision of a rotary plug valve for changing the direction of flow of fluid under pressure through an angle of approximately 90°, employing a resilient sealing ring diagonally disposed in the plug thereof and rotatable therewith.

A still further object is the provision of a rotary plug angle valve employing a diagonally disposed resilient sealing ring in stretched or extended condition.

Further objects of the invention will be in part obvious and in part pointed out hereinafter.

The invention and the novel features may best be made clear from the following description and the accompanying drawings, in which.

Figure 1:
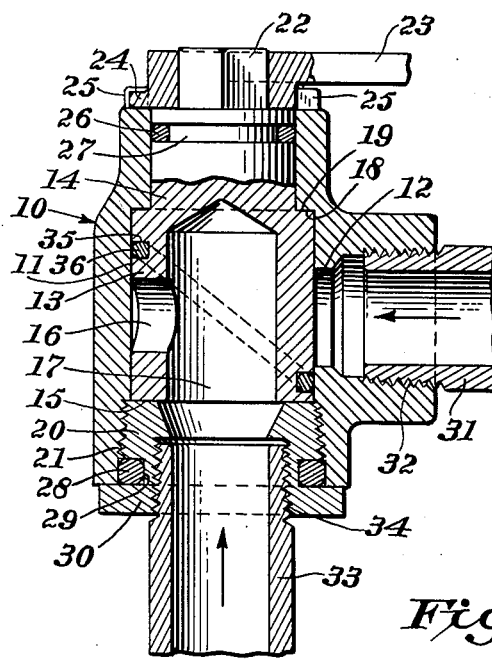
Figure 1 is a section through a preferred embodiment of the rotary plug angle valve of this invention, showing the plug in closed position.

Referring to the drawings, there is shown a rotary plug angle valve comprising the valve body 10 having the longitudinal bore 11 therethrough, and the lateral inlet port 12 communicating with bore 11, preferably at right angles thereto. Rotatably mounted in bore 11 is the tubular plug 13, provided with the closed end 14 and the opposite open end 15. Plug 13 also comprises the lateral port 16, and the outlet port 17, defined by the open end 15. The plug 13 is provided between lateral port 16 and the closed end 14 thereof with the shoulder 18, maintained in seating engagement with the internal seat 19 of body 10 by the retainer ring 20, in retaining engagement with the open end 15 of plug 13. Retainer ring 20 is suitably affixed to body 10 adjacent open end 15, as by the screw thread 21. It will be noted that the bore seat 19 is so disposed, and shoulder 18 and port 16 so spaced on the plug 13, as to position the port 16 for registry with inlet port 12 when the plug is in open position.

The closed end 14 of plug 13 preferably extends beyond body 10, and comprises the operating stud 22, to which the valve handle 23 is suitably secured. The boss 24 may extend from handle 23, adapted to engage the stops 25, extending from body 10 and positioned to limit the rotation of handle 23 and plug 13 to an arc of substantially 180°, one end of which marks complete registration of plug port 16 with inlet port 12, corresponding to full open position of the valve. The stops 25 and boss 24 may be omitted, however, since the valve is adapted to be rotated from open to closed position and from closed to open position in either direction with equal efficiency, as will presently be more fully apparent.

The annular sealing ring 26 is desirably provided between closed end 14 and body 10 adjacent the end of bore 11, conveniently in the groove 27 provided therefor in the closed end 14, as shown, and the annular sealing ring 28 provided between retainer ring 20 and body 10, conveniently in the retainer ring groove 29. To limit the extent of entry into body 10, retainer ring 20 may be provided with the outstanding collar 30, positioned and adapted to bear upon the adjacent end of body 10. Suitable means, such as the pipe 31, is provided in communication with inlet port 12 of body 10 for the introduction of pressure fluid thereinto, threaded into the screw thread 32 thereof, or otherwise suitably affixed, and the outlet pipe 33 may extend from outlet port 17, preferably in threaded engagement with the internal thread 34 of retainer ring 20.

Figure 2:
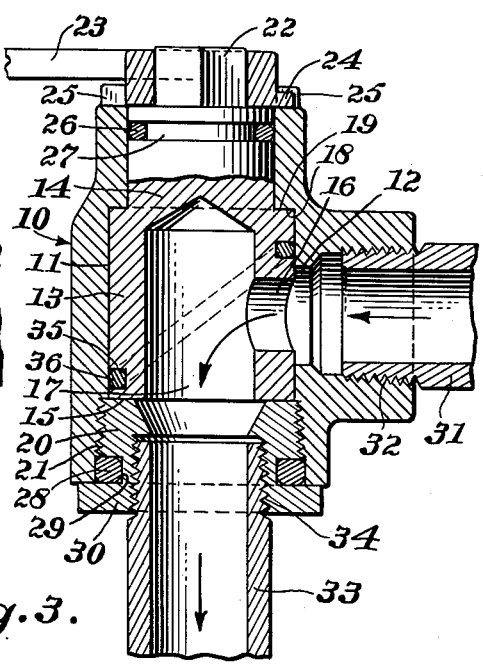
Figure 2 is a section corresponding to Figure 1, but showing the plug in open position.

In the outer surface of plug 13 is provided the diagonal groove 35, encircling the axis of plug port 16 in a plane disposed to pass between the plug port 16 and the closed end 14 of plug 13. In this disposition, it will be seen, the plane of groove 35 lies between inlet port 12 on the one hand, and plug port 16 and outlet port 17 on the other hand, when the plug is in closed position (Figure 1), while all three ports lie on the same side of the plane of groove 35 when the plug is in open position (Figure 2). Retained in groove 35 in sealing engagement with bore 11 is the resilient O-ring or sealing ring 36, made of rubber or similarly suitable resilient material. Sealing ring 36 is preferably of circular or oval cross-section, and of a cross-sectional diameter slightly exceeding the depth of groove 35, so that the sealing ring is normally under slight compression between the walls of the groove and bore 11. The sealing ring 36 is also preferably of a circumference slightly less than that of groove 35, so that it is normally slightly extended or stretched when in place therein. It is to be particularly noted, however, that the cross-sectional shape of the sealing ring 36 is not critical, and need not be round nor oval, but may be of square, polygonal or other shape or configuration, the effectiveness thereof residing principally in its dispostion in the plug 11. Similarly, the groove 36 is preferably of square or rectangular cross-section, but may be of triangular or other cross-sectional configuration.

The functioning of the valve will now be described in detail. Fluid under pressure is admitted through pipe 31 to inlet port 12 of body 10, in the direction of the arrow in Figure 1. The plug 13 and bore 11 being cylindrical, a slight clearance necessarily exists between them by reason of manufacturing tolerances, which enables the pressure fluid to reach the groove 35. With the plug in closed position, as shown in Figure 1, the fluid acts from the right and reaches the upper surface of the resilient sealing ring 36, and thereupon acts from above to compress the sealing ring 36 downwardly against the lower or far wall of the groove 35, expanding sealing ring 36 laterally to form an effective seal between body 10 and plug 13. With the plug in this position, it will be readily seen, the diagonal disposition of the sealing ring prevents leakage of pressure fluid to plug port 16 and outlet port 17.

The valve is adapted for use with pressures ranging from a few pounds per square inch to extremely high pressures, of the order of five thousand pounds per square inch or more, the maximum feasible pressure being determined primarily by the strength of the valve body and the connections thereto. The higher the pressure in inlet port 12, the greater will be the force compressing sealing ring 36, and the more effective the seal thereof. The effectiveness of the seal may be enhanced by lubricating the groove 35 and sealing ring 36, preferably with a heavy grease. The friction of the seal has been found to be considerably less than that of compression packing elements capable of holding comparable pressures.

With the plug in the open position shown in Figure 2, the pressure fluid readily passes through inlet port 12 and the plug port 16 in registry therewith to the interior of plug 13, and thence through the outlet port 17, as indicated by the arrows, the direction of flow having changed approximately 90°. With the plug in this position, it will be seen that pressure fluid acts on the sealing ring 36 from below, whereby the ring is forced into sealing relationship with bore 11, and leakage of fluid to the upper end of plug 13 is obviated.

Figure 3:
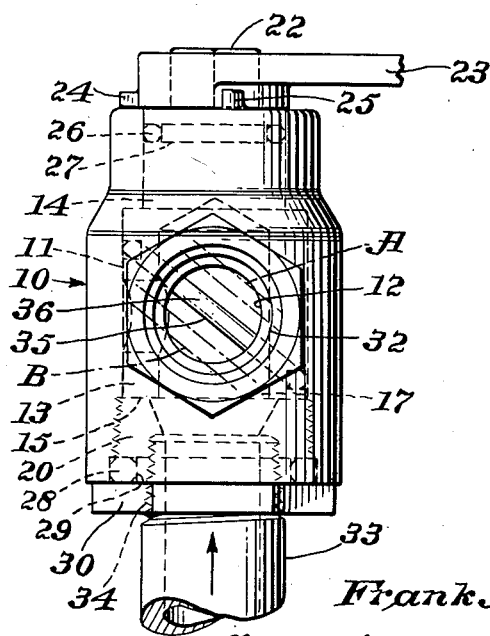
Figure 3 is an elevation of the valve of Figures 1 and 2, looking toward the inlet port thereof, and showing the plug in intermediate position.

In revolving 180° from open to closed position, the sealing ring 36, it will be apparent, must traverse the inlet port 12, as clearly shown in Figure 3. With the sealing ring moving from right to left, as shown, corresponding to clockwise rotation of the handle 23, the sealing ring is first exposed by the leading edge of inlet port 12 when the ring is in the dotted line emerging position A. When the sealing ring is thus partially exposed by emergence from between the walls of the plug and the body it is relatively free from the effect of the fluid pressure and in a relaxed condition, whereupon it expands to its normal cross-sectional diameter and protrudes slightly into the port. This tendency, however, is somewhat opposed by the lateral force of the pressure fluid in the inlet port. The same conditions are obtained when the sealing ring has partially traversed the inlet port, in the solid line position shown in Figure 3. When the sealing ring reaches the dotted line sealing position B, however, the full force of the pressure fluid is exerted against that section of the sealing ring still exposed in the inlet port, forcing the still exposed section of the ring back into the groove and allowing the sealing ring to pass easily under the trailing edge of the port without damaging contact, whereby a seal is effected between the plug and the valve body, and also between the inlet port 12 and the plug port 16. When the sealing ring is of slightly smaller circumference than the groove 35, as is preferred, the stretched condition of the sealing ring, it has been found, facilitates the passage of the ring under the trailing edge of the port, permitting it to glide thereunder with ease and safety.

In rotating in the reverse direction from closed to open position, the same conditions recur in opposite sequence. With the sealing ring in the now emerging position B, the section of the ring exposed by the leading edge of the port tends to expand or protrude slightly thereinto. When the sealing ring has reached the position A, however, the full force of the fluid pressure in the inlet port of the valve body is brought to bear upon that section of the ring still exposed by the trailing edge of the port, and the ring is effectively forced back into the groove enabling the sealing ring to glide easily under the edge of the inlet port and complete the seal without damaging contact with the port.

As will be evident, the valve operates in the same manner whether the direction of rotation of the plug be clockwise or counter-clockwise. The plug, therefore, may be operated by rotation always in the same direction, or, if desired, its operative movement may be limited to an arc of 180°, as by the stops 25, in the manner previously described. The valve is not adapted to the passage of pressure fluid therethrough in the direction opposite to that indicated, and reversal of the direction of pressure will result in destruction of the sealing ring the first time the valve is closed. Should pressure fluid be admitted to the outlet port 17 rather than the inlet port 12, the sealing ring 36, when traversing the inlet port 12 in moving from open to closed position, will not only expand due to its own internal pressure, but the pressure fluid reaching the groove 35 from the outlet port 17 will forcibly cause the ring to bulge out into the then low pressure inlet port 12, a consequence which will be magnified as the ring approaches the trailing edge of the port to effect a seal, and further rotation of the plug toward closed position will be impossible without shearing off the resulting bulge or blister of the sealing ring, or otherwise severely damaging the ring in passage under the trailing edge of the port, whereby the sealing effectiveness of the ring is destroyed. As will be apparent, with the direction of fluid pressure reversed from that indicated in the drawings, destruction of the sealing ring will occur upon rotation of the plug from open position to closed position in either direction.

The sealing rings 26 and 28 are desirably of the same type as the resilient sealing ring 36, and function by leakage of pressure fluid within the valve body thereto, to seal the valve body and prevent leakage therepast. Pressure fluid may reach the sealing ring 28 by passage along the screw thread 21 when the plug is in open position, and is contained by the lateral expansion of the ring 28 to form an effective seal in the manner previously described. With the plug in closed position, pressure fluid passes along the surface of the plug to the sealing ring 26, which is thereby expanded laterally into sealing relationship with the valve body to prevent leakage of fluid to the exterior of the body.

It will thus be seen that there has been provided by this invention a structure in which the various objects hereinabove set forth, together with many practical advantages, are successfully achieved. As various possible embodiments may be made of the mechanical features of the above invention, all without departing from the scope thereof, it is to be understood that all matter hereinabove set forth or shown in the accompanying drawings is to be interpreted as illustrative and not in a limiting sense.

I claim:

1. An angle valve for controlling the flow of fluid under pressure, comprising a valve body having a longitudinal bore therethrough and a lateral inlet port communicating with said bore, a tubular plug rotatably mounted in said bore, said plug having a lateral port positioned for registry with said inlet port when said plug is in open position, one end of said plug being closed and the other end being open and constituting and outlet port, a diagonally disposed groove in the outer wall of said plug encircling the axis of said plug port in a plane passing between said plug port and the closed end of said plug, and a resilient sealing ring in said groove.

2. A valve as defined in claim 1 wherein the normal width of said sealing ring is greater than that of said groove, and the normal circumference of said sealing ring is less than that of said groove.

3. An angle valve for controlling the flow of fluid under pressure, comprising a valve body having a longitudinal bore therethrough and a lateral inlet port communicaing with said bore, a tubular plug having a lateral port rotatably mounted in said bore, one end of said plug being closed and the other end being open and constituting an outlet port, a shoulder on said plug adjacent the closed end thereof, the wall of said bore defining a seat positioned and adapted to engage said plug shoulder and thereby position said lateral port of said plug for registry with said inlet port when said plug is in open position, a retainer ring in engagement with said body bearing on the open end of said plug, whereby said plug shoulder is maintained in seated engagement with said bore seat, a diagonally disposed groove in the outer wall of said plug encircling the axis of said plug port in a plane passing between said plug port and the closed end of said plug, and a resilient sealing ring in said groove.

4. An angle valve for controlling the flow of fluid under pressure, comprising a valve body having a longitudinal bore therethrough and a lateral inlet port communicating with said bore, a tubular plug having a lateral port rotatably mounted in said bore, one end of said plug being closed and the other end being open and constituting an outlet port, a sealing ring between said plug and said body adjacent the closed end of said plug, a shoulder on said plug adjacent the closed end thereof, the wall of said bore defining a seat positioned and adapted to engage said plug shoulder and thereby position and lateral port of said plug for registry with said inlet port when said plug is in open position, a retainer ring in threaded engagement with said body bearing on the open end of said plug, whereby said plug shoulder is maintained in seated engagement with said bore seat, a sealing ring between said retainer ring and said body, a diagonally disposed groove in the outer wall of said encircling of the axis of said plug port in a plane passing between said plug port and the closed end of said plug, and a resilient sealing ring in said groove.

5. A valve as defined in claim 4, wherein the normal width of said resilient sealing ring is greater than that of said groove, and the normal circumference of said sealing ring is less than that of said groove.

FRANK H. MUELLER.

REFERENCES CITED

The following references are of record in the file of this patent:

UNITED STATES PATENTS

| Number | Name | Date |
|---|---|---|
| 862,826 | Kieren | Aug. 6, 1907 |
| 1,187,165 | Moehn | June 13, 1916 |
| 1,554,470 | Trumble | Sept. 22, 1925 |
| 2,360,733 | Smith | Oct. 17, 1944 |
| 2,392,319 | Harwood | Jan. 8, 1946 |
| 2,484,723 | Pain | Oct. 11, 1949 |
| 2,505,951 | Feaster | May 2, 1950 |

FOREIGN PATENTS

| Number | Country | Date |
|---|---|---|
| 3,184 | Great Britain | of 1884 |
| 9,032 | Great Britain | of 1889 |
| 710,360 | France | of 1931 |